(12) United States Patent
West

(10) Patent No.: US 6,646,837 B2
(45) Date of Patent: Nov. 11, 2003

(54) ACTIVE GROUND CURRENT REDUCTION DEVICE

(75) Inventor: Orrin B. West, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 09/682,994

(22) Filed: Nov. 6, 2001

(65) Prior Publication Data

US 2002/0190580 A1 Dec. 19, 2002

Related U.S. Application Data

(60) Provisional application No. 60/246,273, filed on Nov. 6, 2000.

(51) Int. Cl.$^7$ ................................................. H02H 3/00
(52) U.S. Cl. ............................... 361/42; 361/44; 361/45
(58) Field of Search ............................ 361/42, 44, 45, 361/47, 49, 93.1

(56) References Cited

U.S. PATENT DOCUMENTS

| | | | |
|---|---|---|---|
| 3,558,980 A | 1/1971 | Florance et al. | |
| 3,573,551 A | 4/1971 | Sircom | |
| 3,641,393 A | 2/1972 | Florance et al. | |
| 3,670,206 A | 6/1972 | Sircom | |
| 3,757,169 A | 9/1973 | Beresnikow | |
| 3,969,711 A | 7/1976 | Ahntholz | |
| 3,976,987 A | 8/1976 | Anger | |
| 4,037,265 A | 7/1977 | Smith | |
| 5,619,079 A | * 4/1997 | Wiggins et al. | ................ 307/89 |
| 5,831,842 A | * 11/1998 | Ogasawara et al. | ........... 363/40 |

* cited by examiner

Primary Examiner—Gregory J. Toatley, Jr.
Assistant Examiner—James A. Demakis
(74) Attorney, Agent, or Firm—Seed IP Law Group PLLC

(57) ABSTRACT

A device inserted between a grounded poly-phase external voltage source and a load providing low insertion loss for differential mode currents and high insertion loss for ground currents. The device receives voltages from the grounded poly-phase external voltage source over atone or more voltage lines. The voltages contain common mode voltages. A filter connected to each of the voltage lines reduces the ground current from the load. A summing block adds the voltages from each of the voltage lines to generate a total common mode voltage. A ground referenced controlled voltage source generates a cancellation voltage equal to the total common mode voltage in response to the generation of total common mode voltage. The total common mode voltage is injected into the filter and substantially reduces the common mode voltage on each voltage line thereby substantially reducing the ground currents associated with each common mode voltage on each voltage line.

10 Claims, 4 Drawing Sheets

ACTIVE GROUND CURRENT REDUCTION DEVICE

CROSS REFERENCE TO RELATED APPLICATIONS

This application claims priority to U.S. Provisional Patent Application No. 60/246,273 filed on Nov. 6, 2000.

BACKGROUND OF INVENTION

1. Technical Field

The present invention relates to the field of electronics. More specifically, this invention relates to a device that allows the transfer of power from a grounded external source to an electrical apparatus in those instances where there is a limit on the ground current due to shock hazard.

In this disclosure, the term "ground current" refers to any current flowing through the ground connection of the external grounded source. This same current is also referred to as "common mode current." The term "common mode voltage" refers to any voltage which can act as a source of ground current.

2. Background Information

Many electronic components today contain features for protection against electrical shock. Generally speaking, these features provide monitoring to determine if there is electricity discharging where it should not be, or leaking. When electrical leakage is detected, the features are designed to turn components off in order to protect against shock. In an instance such as charging of a battery, turning off of the components may prevent such desired charging. Accordingly, a need is recognized for a device that detects electrical leakage and is able to capture the leakage without turning other components off.

Referring to FIG. 1, an exemplary circuit for reducing ground current from an active load back through a main source is illustrated. Since FIG. 1 only illustrates an equivalent circuit for ground current, there may be additional sets of elements not shown therein. As shown, a grounded voltage source 12 is connected to a device 10, which in turn is connected to a load 18. The load 18 is considered to contain, in part, active circuitry such as switching devices that generate high frequency voltages with respect to the grounded enclosure, which in turn source current to the grounded enclosure through capacitance existing between the active circuitry and the grounded enclosure. FIG. 1 is solely intended to be the equivalent circuit for ground current and does not represent intended power flow between the source 12 and the load 18. For example, the exemplary circuit can be a charging system with the grounded voltage source 12 being an outlet, the device 10 being a filter for reducing load sourced ground current and the load 18 being a battery charger for charging a battery. The grounded voltage source 12 generates a common mode voltage that typically consists of low frequencies in value ranging from dc up to several hundred hertz ("Hz."). For example, if the source 12 is from a standard utility, the frequency of the common mode voltage would be 50 Hz in Europe and 60 Hz in the United States, if the source 12 is an airborne source the frequency could be 400 Hz. Similarly, a ground current is associated with the load with ground current consisting of higher frequency components typically ranging in value from several kHz to several MHz.

The load 18 must be powered from a grounded supply in such a way that the total ground current is kept below a given level to avoid a shock hazard. Moreover, circuits such as that shown in FIG. 1 typically contain a ground fault detector (not shown) that shuts down the device 10 if ground current is excessive. For example, if no filter was present in FIG. 1, the ground current from the source would be low and the ground current from the load would be high, causing the device 10 to shut down. Thus, as known in the art, a filter positioned between the voltage source 12 and the load 18 assists in keeping the ground current from the load 18 within the device 10. As illustrated, the filter consists of an inductor $L_1$ 14 and a capacitor $C_1$ 16. By increasing the capacitance of capacitor $C_1$ 16, the amount of ground current passing through the device 10 is reduced, or more specifically, the amount of ground current from the load 18 is reduced. However, by increasing the value of capacitor $C_1$ 16, the ground current from the common mode voltage source 12 into the device 10 increases, which can result in an unwanted discharge, e.g., a shock. The shock hazard results from the return line (not shown) containing a voltage higher than ground.

Thus, there is an optimum capacitance value for capacitor $C_1$, resulting in a minimum value of ground current from the common mode voltage source 12. However, in some situations this minimum value of ground current from the common mode voltage source 12 is still above a maximum allowable level. Accordingly, there is needed a device which keeps the load ground current enclosed within the apparatus without limiting the total amount of filtering that may be achieved.

SUMMARY OF INVENTION

In the disclosed embodiment, the present invention alleviates the drawbacks described above with respect to the transfer of power without exceeding a safe level of ground current. The present invention utilizes a controlled voltage source in series with a capacitor of a filter for canceling or substantially reducing ground current from an external power source and reducing the ground current from a load.

In one embodiment, a device is inserted between a grounded poly-phase external voltage source and a load providing low insertion loss for differential mode currents and high insertion loss for ground current. The device includes at least one voltage line, a filter, a summing block, and a ground referenced controlled voltage source. The at least one voltage line receives at least one voltage from the grounded poly-phase external voltage source with the at least one voltage having a common mode voltage. The filter is connected to each of the at least one voltage lines and is configured to reduce the ground current from the load. The summing block is configured to add the voltages from each of the at least one voltage lines to generate a total common mode voltage. The ground referenced controlled voltage source generates a cancellation voltage equal to the total common mode voltage in response to the generation of the total common mode voltage. The total common mode voltage is injected into the filter and substantially reduces the common mode voltage on each voltage line thereby substantially reducing ground currents associated with each common mode voltage on each voltage line.

In one embodiment, a method for providing low insertion loss for differential mode currents and high insertion loss for ground currents for a device between a grounded poly-phase external voltage source and a load. The method includes the steps of receiving at least one voltage from the external source via at least one voltage line, reducing the ground current from the load using a filter, summing the voltage from the at least one voltage line, generating a cancellation common mode voltage equal to the sum of the summed voltages, and injecting the cancellation common mode voltage into the filter. By injecting the cancellation common mode voltage into the filter, the common mode voltage on each voltage line is substantially reduced which substantially reduces the ground current on each voltage line.

The general beneficial effects described above apply generally to each of the exemplary descriptions and characterizations of the devices and mechanisms disclosed herein. The specific structures through which these benefits are delivered will be described in detail herein below.

BRIEF DESCRIPTION OF DRAWINGS

In the following, the invention will be described in greater detail by way of examples and with reference to the attached drawings, in which.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled." This terminology's use contemplates elements being connected together in such a way that there may be other components interstitially located between the specified elements, and that the elements so specified may be connected in fixed or movable relation one to the other. Certain components may be described as being "adjacent" to one another. In these instances, it is expected that a relationship so characterized shall be interpreted to mean that the components are located proximate to one another, but not necessarily in contact with each other. Normally there will be an absence of other components positioned there between, but this is not a requirement. Still further, some structural relationships or orientations may be designated with the word "substantially". In those cases, it is meant that the relationship or orientation is as described, with allowances for variations that do not effect the cooperation of the so described component or components.

Figure 1:
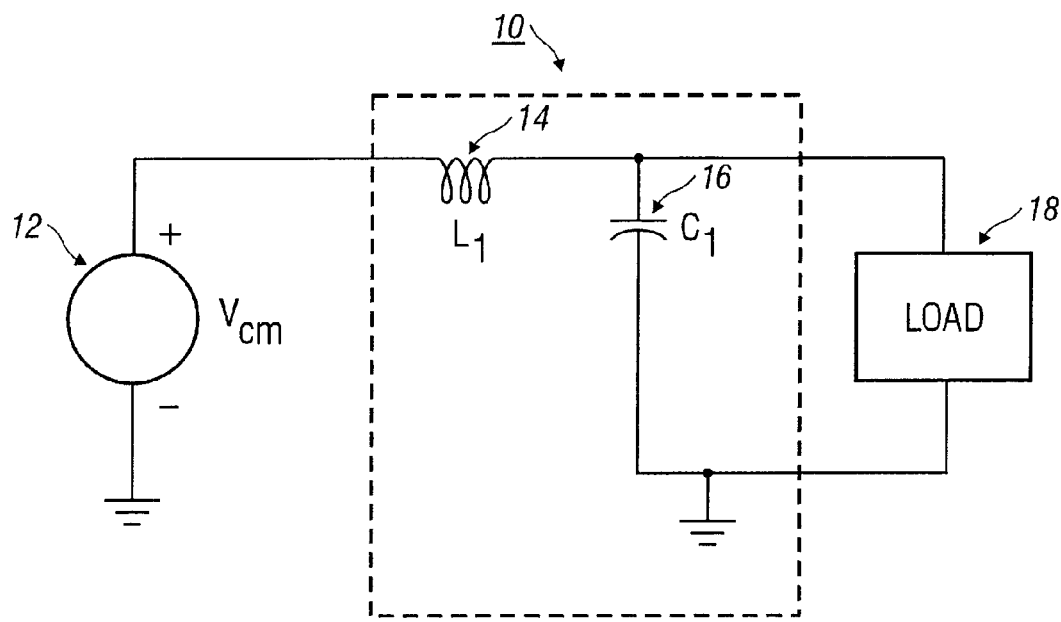
FIG. 1 is an illustration of an exemplary circuit for reducing ground current from an active load back through a main source according to the prior art.
Figure 2:
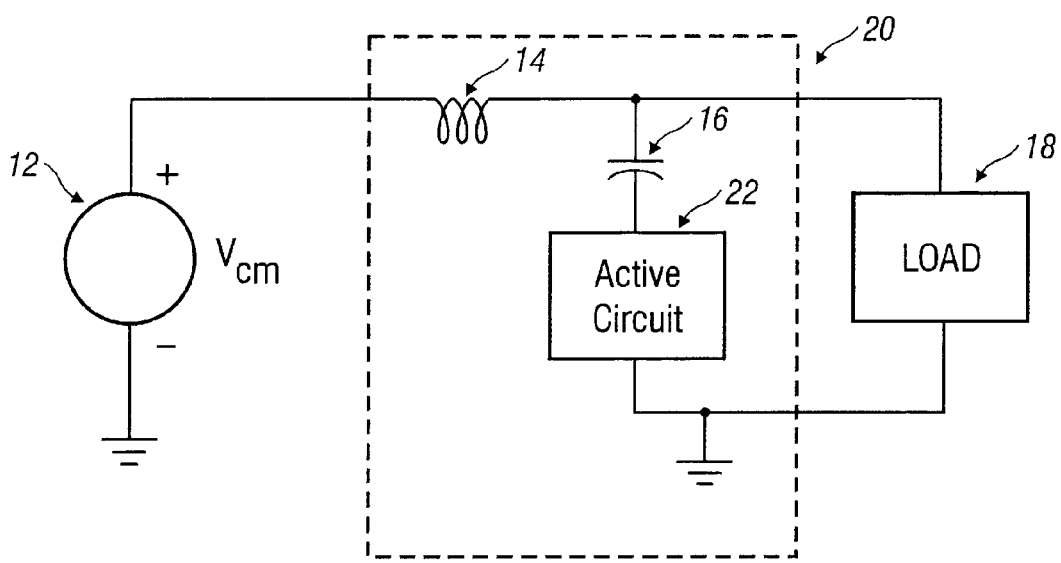
FIG. 2 is an illustration of a circuit for reducing the ground current from a source according to one embodiment of the present invention.

Referring to FIG. 2, a circuit for reducing ground current from a source according to one embodiment of the present invention is illustrated. As shown, the circuit 20 contains an active circuit 22 in series with a capacitor $C_1$ 16 of the filter.

In a preferred embodiment, the active circuit 22 determines the amount of common mode voltage from a source 12 and generates a voltage to cancel or substantially reduce the amount of common mode voltage. Thus, the active circuit 22 cancels the ground current from the source 12 and allows the capacitor $C_1$ 16 in the filter to be increased, thus further reducing the ground current generated by the load 18. In the preferred embodiment, the active circuit 22 is powered by an isolated power supply (not shown) that does not contribute to ground current. The function of this controlled voltage source is to generate a voltage for canceling the common mode voltage of the main source, while at the same time acting as a short circuit at the frequencies of the load ground current components. This controlled voltage source will then generate a ground current that will exactly cancel or substantially reduce the ground current generated by the source common mode voltage 12 that flows into the filter element C 16. By doing so, filter element C 16 may be made arbitrarily large in order to reduce the ground current generated by the load without increasing the source ground current. As a result, the circuit causes the insertion impedance of the common mode voltage to remain small at the frequencies of the load ground current.

Figure 3:
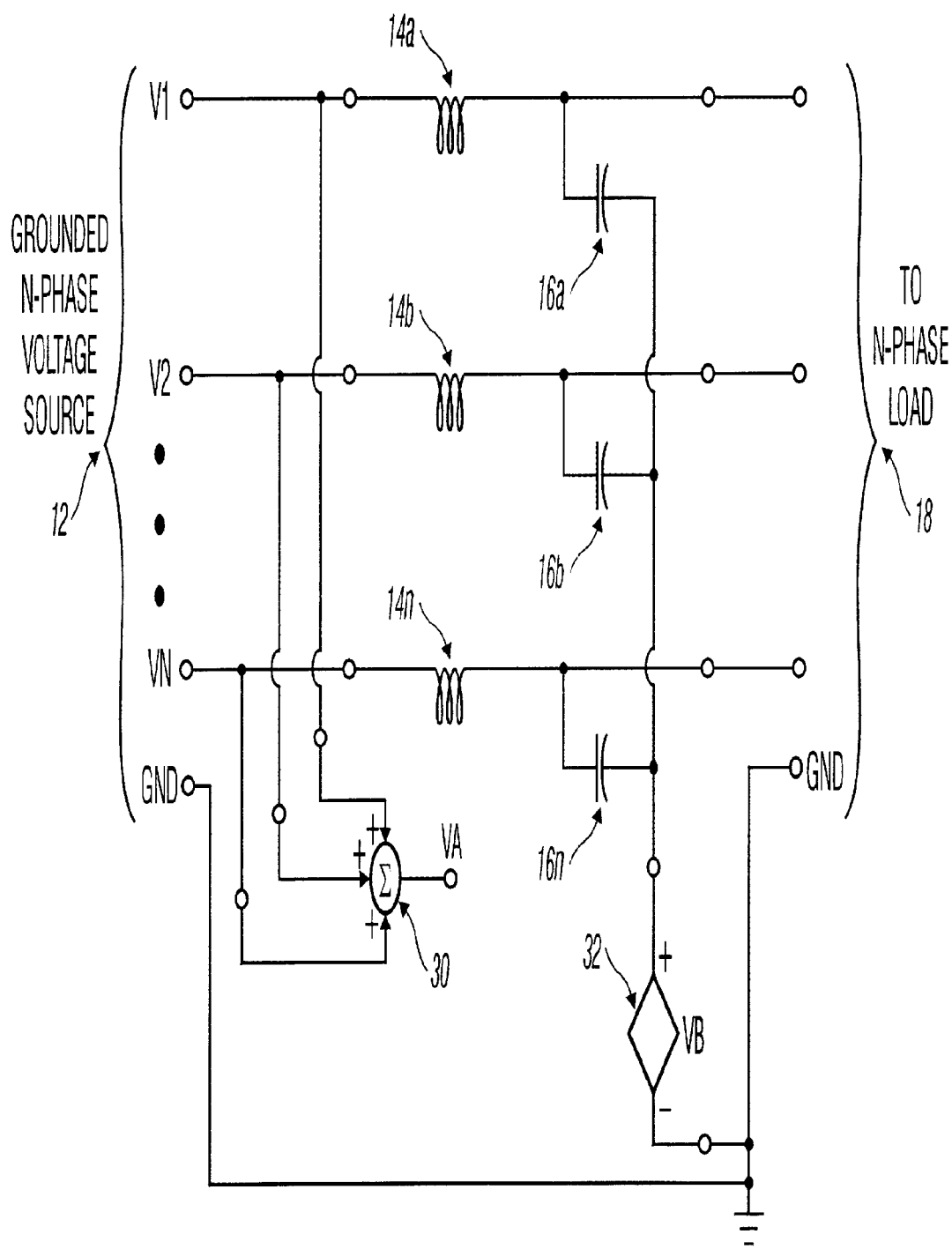
FIG. 3 is an illustration of the circuitry of an active circuit for reducing ground current from a source according to one embodiment of the present invention.

Referring to FIG. 3, an active circuit for reducing ground current from a source according to one embodiment of the present invention is illustrated. As shown, a summing block 30 measures or adds the voltages from each voltage line of the grounded n-phase voltage source 12. In the preferred embodiment, the grounded voltage source 12 is any of the standard utility configurations for electrical power distribution such as residential single phase three-wire systems providing 120 VAC line to neutral and 240 VAC line-to-line and commercial three phase three and four wire systems. In an alternate embodiments, the grounded source can have an arbitrary number of low frequency phases, each with arbitrary frequency, phase amplitude and waveshape. For example, only one voltage is used for an unbalanced single phase voltage source, two voltages are added for a balanced single phase voltage source and three or more voltages are added for a balanced poly-phase of N-phases. Specifically, the common mode voltages are measured at the input of the filter.

The summing block 30 adds the voltages together to form voltage VA. A controlled voltage source 32 generates voltage VB that equals voltage VA. In the preferred embodiment, the controlled voltage source 32 is a ground referenced controlled voltage source. Thus, the controlled voltage source injects a voltage into the circuit, thereby canceling or substantially reducing the source common voltage resulting in zero ground current. In other words, the filter, inductors 14a–14n and capacitors 16a–16n cancel or substantially reduce the common mode voltage on each voltage line.

Figure 4:
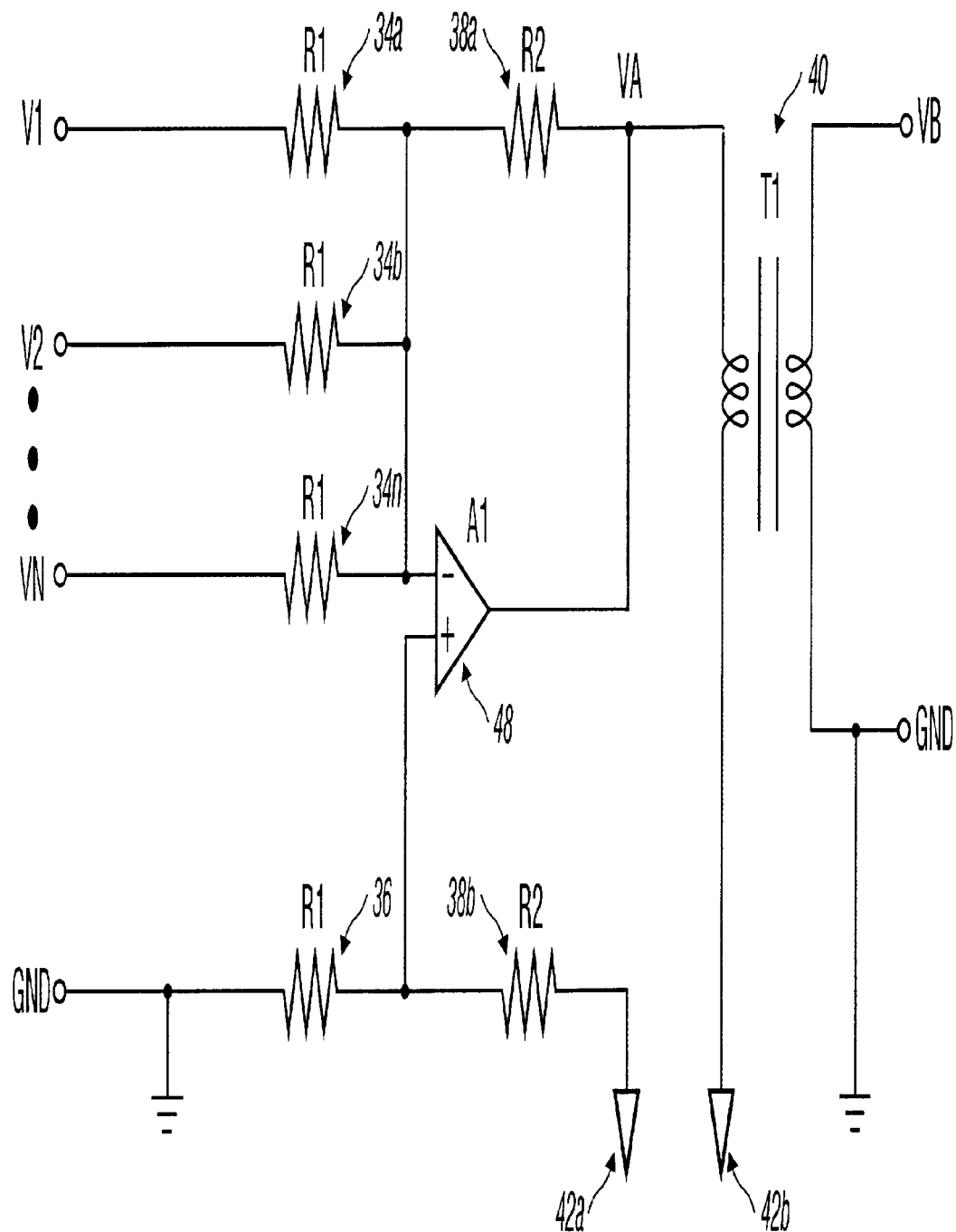
FIG. 4 is an illustration of an ideal active circuit for reducing ground current from a source according to one embodiment of the present invention.

Referring to FIG. 4, an ideal active circuit for reducing ground current from a source according to one embodiment of the present invention is illustrated. As shown, the summing block comprises an operational amplifier A1 (op amp) 48 configured as a summing differential amplifier. As illustrated, resistors R1 34a–34n, 36 and R2 38a, 38b are used to properly set the gain of the differential amplifier A1 48. In the preferred embodiment, transformer T1 40 serves as the controlled voltage source of FIG. 3. Further, the product of the differential amplifier gain and transformer turns ratio is set equal to one, thereby providing voltage VB with a correct amplitude. The secondary of transformer T1 40 is grounded to give VB the correct reference. In the preferred embodiment, the primary of transformer T1 40 and resistor R2 38a, 38b are powered from a power supply independent of the N-phase source.

Figure 5:
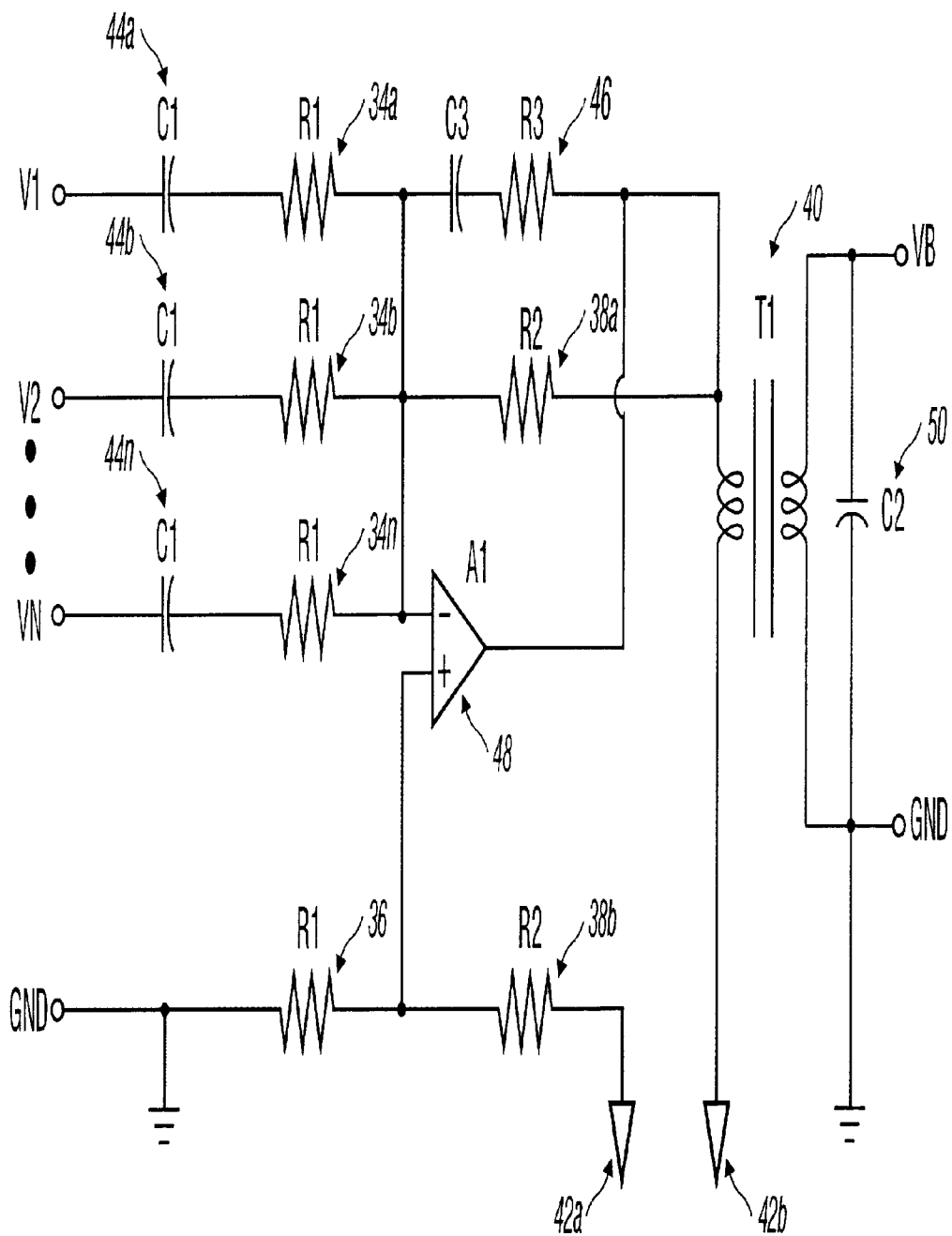
FIG. 5 is an illustration of an actual active circuit for reducing ground current from a source according to one embodiment of the present invention.

FIG. 5 is an actual active circuit for reducing ground current from a source according to one embodiment of the present invention as illustrated. Specifically, capacitor $C_2$ 50 shunts the output inductance of transformer T1 40 to ensure low impendence at high frequencies. The resistors R1 34a–34n, 36, R2 38a, 38b, and R3 46 and capacitors C1 44a–44n and C3 52 associated with the differential amplifier A1 48 compensate for the phase shift through the transformer T1 40 caused by winding resistances and leakage inductances.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

INDUSTRIAL APPLICABILITY

The present invention finds applicability in the electronics industries, and more specifically in devices or applications wherein the load generates high frequency common mode voltage. Of particular importance is the invention's incorporation into utility connected non isolated power conversion devices.

What is claimed is:

1. A device to be inserted between a grounded poly-phase external voltage source and a load providing low insertion loss for differential mode currents and high insertion loss for ground currents, the device comprising:

at least one voltage line for receiving at least voltage from the grounded poly-phase external voltage source, wherein the at least one voltage comprises a common mode voltage;

a filter connected to each of the at least one voltage lines, the filter is configured to reduce the ground current from the load;

a summing block configured to add the voltages from each of the at least one voltage lines to generate a total common mode voltage;

a ground referenced controlled voltage source for generating a cancellation voltage equal to the total common mode voltage in response to the generation of the total common mode voltage, wherein the total common mode voltage is injected into the filter and substantially reduces the common mode voltage on each voltage line thereby substantially reducing ground currents associated with each common mode voltage on each voltage line.

2. The device of claim 1 wherein the filter comprises an inductor and a capacitor for each voltage line.

3. The device of claim 1 wherein the summing block is a summing differential amplifier.

4. The device of claim 3 further comprising an additional power source independent of the grounded poly-phase external source common mode voltage source, the additional power source is configured to power the differential amplifier.

5. The device of claim 3 wherein the wherein the ground referenced controlled voltage source is a transformer.

6. The device of claim 5 further comprising an additional power source independent of the grounded poly-phase external source common mode voltage source, the additional power source is configured to power the transformer.

7. The device of claim 1 wherein the grounded poly-phase external voltage source is an unbalanced single phase voltage source.

8. The device of claim 1 wherein the grounded poly-phase external voltage source is a balanced single phase voltage source.

9. The device of claim 1 wherein the grounded poly-phase external voltage source is a balanced poly-phase of n phases.

10. A method for providing low insertion loss for differential mode currents and high insertion loss for ground currents for a device between a grounded poly-phase external voltage source and a load, comprising the steps of:

receiving at least one voltage from the external source via at least one voltage line;

reducing ground current from the load using a filter;

summing the voltage from the at least one voltage line;

generating a cancellation common mode voltage equal to the sum of the summed voltages;

injecting the cancellation common mode voltage into the filter thereby substantially reducing the common mode voltage on each voltage line thereby substantially reducing ground current on each voltage line.

* * * * *